(12) United States Patent
Hirayama

(10) Patent No.: US 12,363,353 B2
(45) Date of Patent: Jul. 15, 2025

(54) MOVING IMAGE DISTRIBUTION METHOD, MOVING IMAGE REPRODUCTION METHOD, MOVING IMAGE DISTRIBUTION APPARATUS, AND DISTRIBUTION DATA STRUCTURE

(71) Applicant: Ohmi Digital Fabrications Co., Ltd., Shiga (JP)

(72) Inventor: Takuma Hirayama, Shiga (JP)

(73) Assignee: Ohmi Digital Fabrications Co., Ltd., Shiga (JP)

( * ) Notice: Subject to any disclaimer, the term of this patent is extended or adjusted under 35 U.S.C. 154(b) by 57 days.

(21) Appl. No.: 17/623,362

(22) PCT Filed: Feb. 26, 2021

(86) PCT No.: PCT/JP2021/007303
§ 371 (c)(1),
(2) Date: Dec. 28, 2021

(87) PCT Pub. No.: WO2021/172506
PCT Pub. Date: Sep. 2, 2021

(65) Prior Publication Data
US 2022/0368957 A1    Nov. 17, 2022

(30) Foreign Application Priority Data
Feb. 29, 2020    (JP) ................................ 2020-034530

(51) Int. Cl.
*H04N 21/218*    (2011.01)
(52) U.S. Cl.
CPC ... *H04N 21/21805* (2013.01); *H04N 21/2181* (2013.01)

(58) Field of Classification Search
CPC ......... H04N 21/21805; H04N 21/2181; H04N 5/765; H04N 21/41407; H04N 21/4728;
(Continued)

(56) References Cited

U.S. PATENT DOCUMENTS

| | | | |
|---|---|---|---|
| 11,089,280 B2* | 8/2021 | Castleman | ........... H04N 13/383 |
| 2018/0374192 A1* | 12/2018 | Kunkel | ................. H04N 23/58 |
| 2020/0275083 A1* | 8/2020 | Yoneda | .............. H04N 21/4728 |

FOREIGN PATENT DOCUMENTS

| | | |
|---|---|---|
| JP | 2008-252832 A | 10/2008 |
| JP | 6149967 B1 | 6/2017 |
| JP | 2017-135464 A | 8/2017 |

OTHER PUBLICATIONS

International Search Report issued Jun. 1, 2021 in corresponding International Patent Application No. PCT/JP2021/007303, filed Feb. 26, 2021 (with English Translation).

* cited by examiner

*Primary Examiner* — Alazar Tilahun
(74) *Attorney, Agent, or Firm* — Global IP Counselors, LLP

(57) ABSTRACT

A moving image distribution method and a moving image distribution apparatus for reducing an increase in server load due to a change in a user's line of sight includes storing a video stream for each viewpoint of a plurality of viewpoints defined on a sphere with a camera as a point of observation, the video stream covering the sphere, and distributing the video stream to a user terminal. The distributing including distributing the video stream for the viewpoint other than a nearest viewpoint, corresponding to a line of sight determined by the user terminal, on the sphere.

14 Claims, 11 Drawing Sheets

(58) Field of Classification Search
CPC ...... H04N 21/816; H04N 7/181; H04N 19/17; G06F 3/14; G06F 13/00; G06F 3/013; G06F 3/0481
See application file for complete search history.

FUNCTION FOR CASE WHERE ANGLE
OF VIEW INFORMATION IS 30°

FUNCTION FOR CASE WHERE ANGLE
OF VIEW INFORMATION IS 90°

FUNCTION FOR CASE WHERE ANGLE OF VIEW
INFORMATION IS 127°

MOVING IMAGE DISTRIBUTION METHOD, MOVING IMAGE REPRODUCTION METHOD, MOVING IMAGE DISTRIBUTION APPARATUS, AND DISTRIBUTION DATA STRUCTURE

CROSS-REFERENCE TO RELATED APPLICATIONS

This application is a U.S. National Stage application of International Application No. PCT/JP2021/007303, filed Feb. 26, 2021, which claims priority to Japanese Patent Application No. 2020-034530, filed Feb. 29, 2020, the contents of each of which are hereby incorporated by reference.

BACKGROUND

Field of the Invention

The present invention relates to a moving image distribution method, a moving image reproduction method, a moving image distribution apparatus, and a distribution data structure for distributing a moving image.

Background Information

Conventional distribution systems for distributing still images and moving images have been known. For example, a distribution system according to Japanese Patent No. 6149967 includes a server and a client. Key frame images and differential frame images constituting a moving image to be distributed are stored in a memory of the server. If a request from the client is received, the server is configured to distribute the key frame images and the differential frame images stored in the memory to the client.

A panorama moving image distribution system described in Japanese Patent No. 6149967 includes a server configured to distribute the entire background as a low resolution image, and clip out a portion corresponding to a user's line of sight and distribute the clipped portion as a high resolution image. A client receiving the low resolution image and the high resolution image can display the portion viewed by the user with high image quality by combining the images and displaying the resultant on screen.

SUMMARY

It has been determined that the foregoing conventional server needs to perform the processing for clipping high resolution images based on the user's ever-changing viewpoint, therefore, the load of the server increases accordingly if many users access the server. The server load increases further if the server generates key frame images and differential frame images for the moving image to be transmitted (high quality moving image) as described in Japanese Patent No. 6149967.

An object of embodiments of the present invention is to provide a moving image distribution method, a moving image reproduction method, a moving image distribution apparatus, and a distribution data structure that reduces an increase in server load due to a change in the user's line of sight.

To achieve the foregoing object, a moving image distribution method according to an embodiment of the present invention is characterized by including: a step of storing a video stream for each viewpoint of a plurality of viewpoints defined on a sphere with a camera as a point of observation, the video stream covering the sphere; and a distribution step of distributing the video stream to a user's terminal, wherein the distribution step includes distributing a video stream for the viewpoint other than a nearest viewpoint, corresponding to a line of sight determined by the user's terminal, on the sphere.

Moreover, to achieve the foregoing object, a moving image reproduction method according to an embodiment of the present invention is characterized by including: a step of storing a video stream for each viewpoint from a plurality of viewpoints defined on a sphere with a camera as a point of observation, the video stream covering the sphere; and a reproduction step of reproducing the video stream on a user's terminal, wherein the reproduction step includes reproducing a video stream for the viewpoint other than a nearest viewpoint, corresponding to a line of sight determined by the user's terminal, on the sphere.

Moreover, to achieve the foregoing object, a moving image distribution apparatus according to an embodiment of the present invention is characterized by including: a storage unit that stores a video stream for each viewpoint from a plurality of viewpoints defined on a sphere with a camera as a point of observation, the video stream covering the sphere; and a distribution unit that distributes the video stream to a user's terminal, wherein the distribution unit distributes a video stream for the viewpoint other than a nearest viewpoint, corresponding to a line of sight determined by the user's terminal, on the sphere.

Furthermore, a distribution data structure according to an embodiment of the present invention includes a video stream including an image on a line of sight directed from a specific point of observation in a center portion thereof and an image of a sphere captured from the point of observation outside the center portion, wherein the video stream includes a first video stream including an image at a viewpoint on a first line of sight directed from the specific point of observation in the center portion and a second video stream including an image at a viewpoint on a second line of sight directed from the point of observation in the center portion.

Advantageous effects according to the moving image distribution method, the moving image reproduction method, the moving image distribution apparatus, and the distribution data structure of embodiments of the present invention are a reduction an increase in server load due to a change in the user's line of sight.

BRIEF DESCRIPTION OF DRAWINGS

The invention will be explained in more detail hereinafter with reference to the drawings.

DETAILED DESCRIPTION

First Embodiment

A moving image distribution system and a moving image distribution method according to an embodiment of the present invention will be described below with reference to the drawings.

Figure 1:
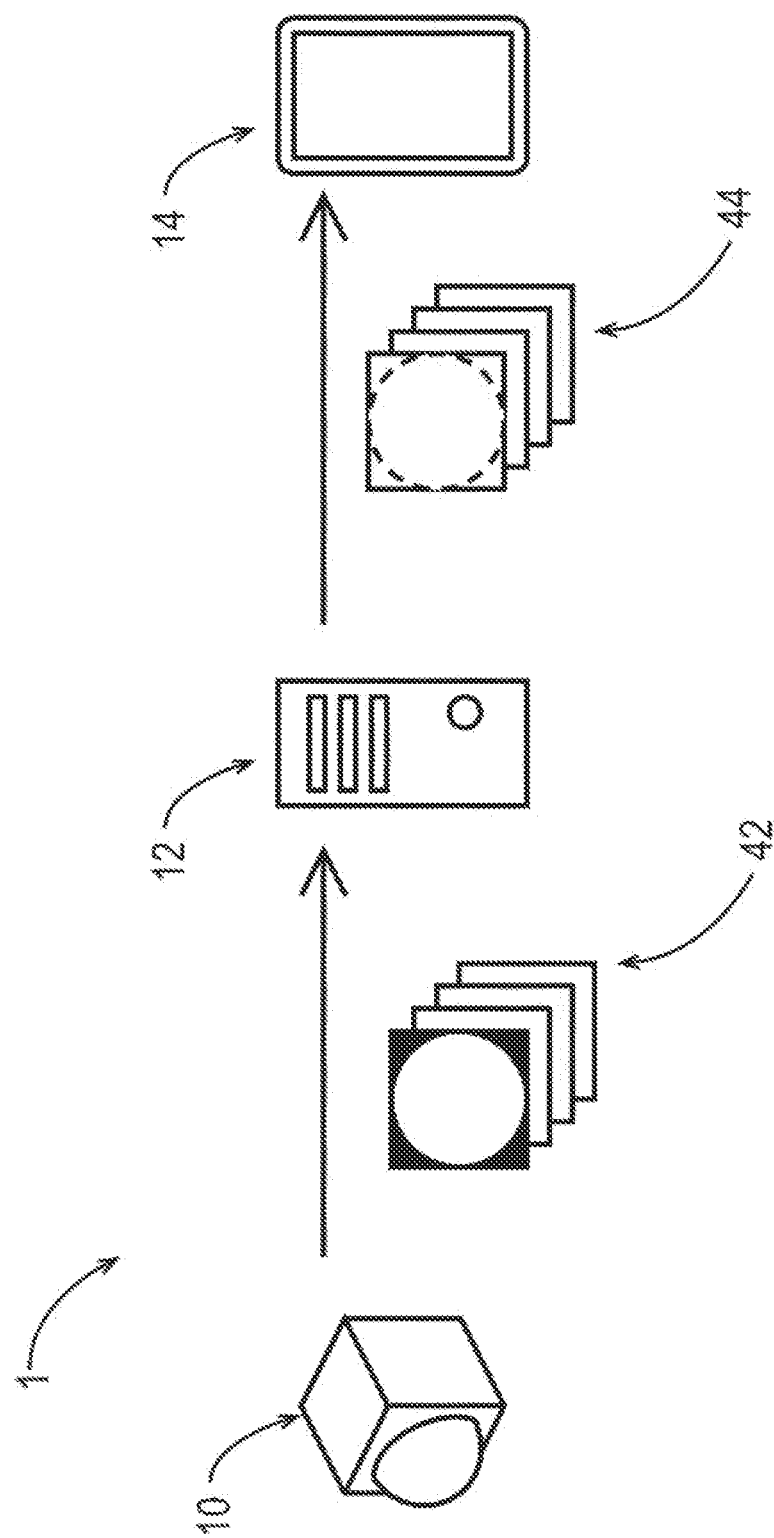
FIG. 1 is a schematic diagram showing a moving image distribution system according to the present embodiment.

As shown in FIG. 1, a moving image distribution system 1 according to a first embodiment is a system for distributing a moving image (video stream 44) to a user's terminal 14 (hereinafter, user terminal 14). The moving image distribution system 1 includes a camera 10 that generates images, and a server 12 functioning as a distribution apparatus that generates moving images for distribution based on the images obtained from the camera 10. The camera 10, the server 12, and the user terminal 14 are connected to a network typified by an Internet communication line. The server 12 can communicate with the camera 10 and the user terminal 14.

Figure 2A:
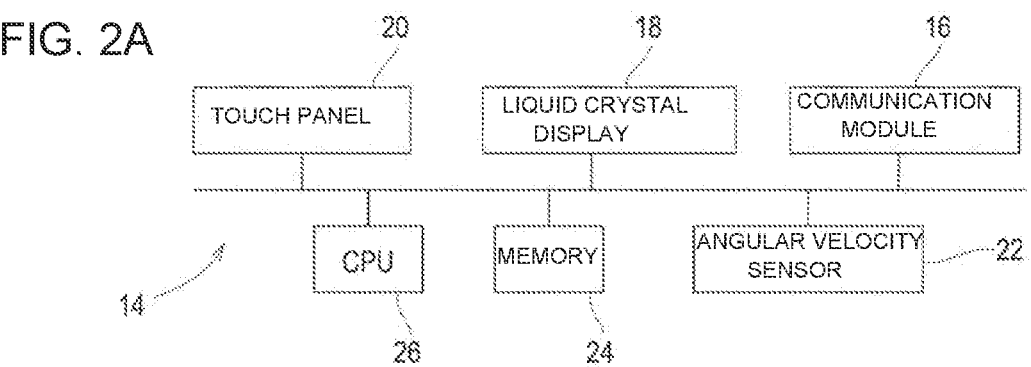
FIG. 2A is a schematic hardware diagram of a user terminal in the moving image distribution system.

The user terminal 14 is a mobile information terminal such as a conventional smartphone and/or tablet terminal. As shown in FIG. 2A, the user terminal 14 includes a communication module 16 (communication unit) that is an interface for connecting to the Internet communication line, a liquid crystal display 18 (display unit) that displays a moving image received from the server 12, a touch panel 20 (input unit) that is disposed on the liquid crystal display 18 in an overlapping manner and accepts an input from the user, an angular velocity sensor 22 (detection unit) that detects the orientation of the terminal, and a CPU 26 (control unit) that controls the liquid crystal display 18, the touch panel 20, and the angular velocity sensor 22 by executing programs stored in a memory 24.

Figure 2B:
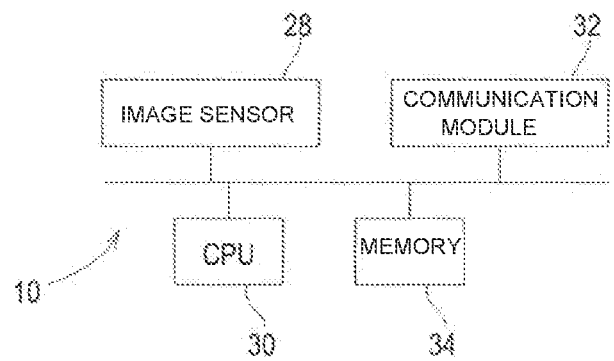
FIG. 2B is a schematic hardware diagram of a camera in the moving image distribution system.

The camera 10 is an apparatus that generates, at the least, a hemispherical image. As shown in FIG. 2B, the camera 10 includes an image sensor 28, a fisheye lens that is an optical component for forming an image (image circle) of an imaginary hemisphere having an infinite radius within a light receiving surface of the image sensor 28 with the image sensor 28 as the point of observation, a CPU 30 that generates a hemispherical image by controlling the image sensor 28 based on an electrical signal output from the image sensor 28, and a communication module 32 for connecting to the Internet communication line. The camera 10 generates hemispherical images at a frame rate of 60 fps (frames per second). A plurality of consecutive hemispherical images thus generated are stored in a memory 34 in the order in which they are generated. If a plurality of hemispherical images (group of hemispherical images) captured and generated over a certain period is accumulated in the memory 34, the camera 10 transmits the group of hemispherical images stored in the memory 34 to the server 12 via the Internet communication line.

Figure 2C:
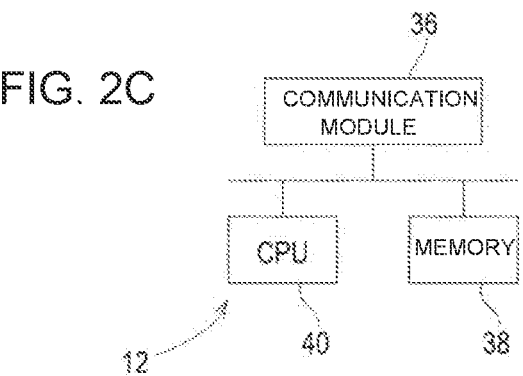
FIG. 2C is a schematic hardware diagram of a server in the moving image distribution system.

The server 12 is a terminal that distributes a moving image (video stream 44), the distribution data, generated based on the group of hemispherical images described above, to the user terminal 14. As shown in FIG. 2C, the server 12 includes a communication module 36 connected to the Internet communication line, a memory 38 storing a moving image generation and distribution program, and a CPU 40 that executes the moving image generation and distribution program.

Figure 3A:
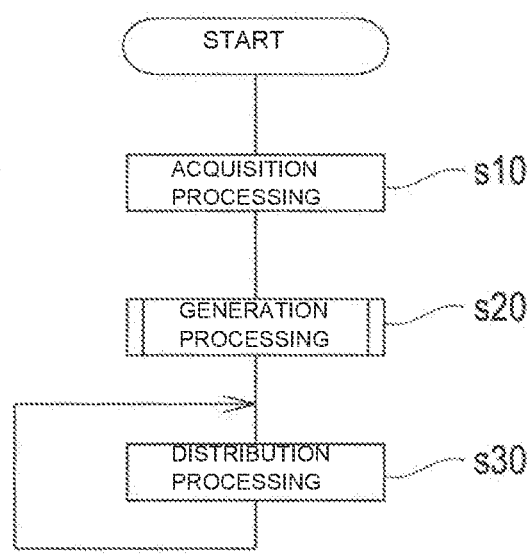
FIG. 3A is a flowchart of a moving image generation and distribution program executed by the server.
Figure 5:
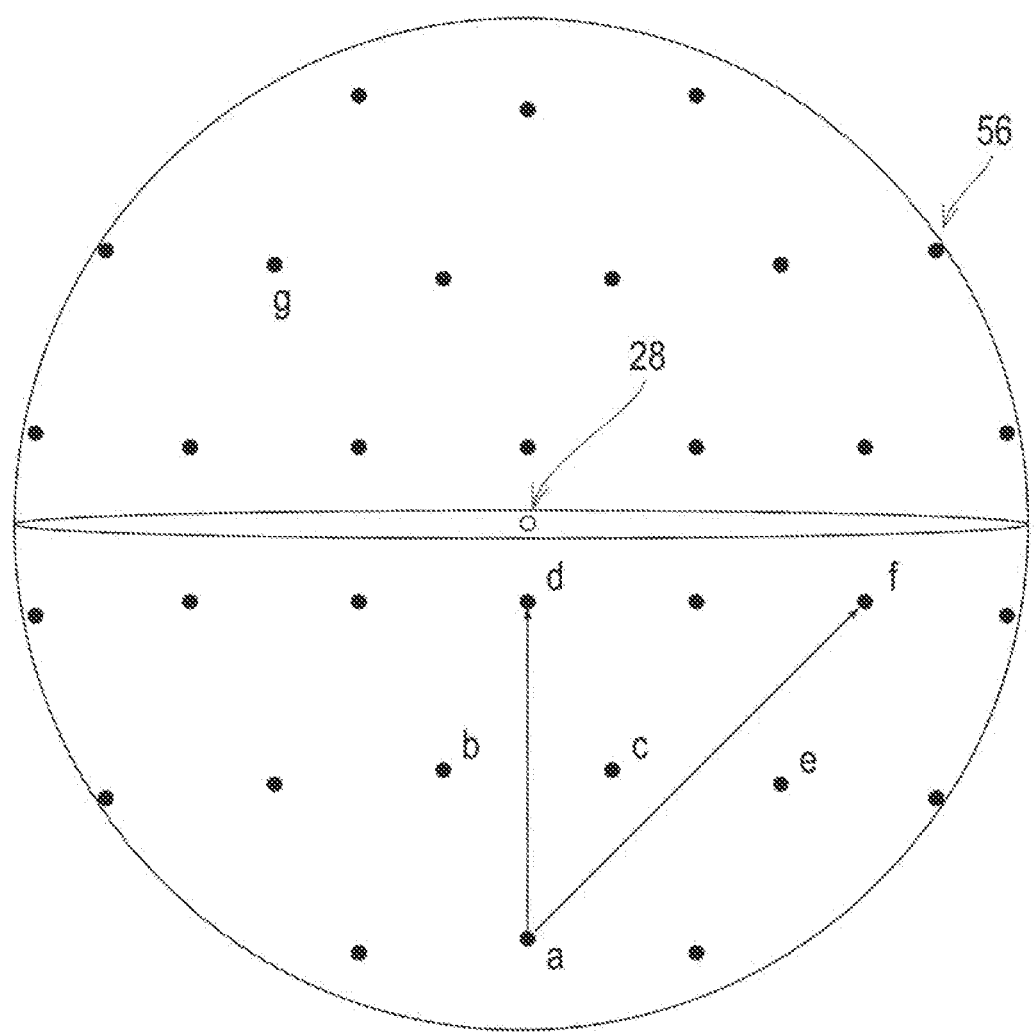
FIG. 5 is a diagram showing the positions of viewpoints.

As shown in FIG. 3A, the moving image generation and distribution program is a program for causing the server 12 to perform acquisition processing (s10) for obtaining a group of hemispherical images from the camera 10, generation processing (s20) for generating a video stream 44 for distribution from the group of hemispherical images obtained, and distribution processing (s30) for distributing a video stream 44 corresponding to a request from the user terminal 14 to the user terminal 14. In the present embodiment, the video stream 44 is generated in the generation processing (s20) for each of viewpoints previously defined on an imaginary full sphere of infinite radius with the image sensor 28 of the camera 10 as a base point as shown in FIG. 5. In other words, with the hemispherical images generated by the camera 10 mapped onto the imaginary full sphere, a plurality of viewpoints are set over the full sphere when observing the full sphere from the user's standpoint set at the center of the full sphere. A video stream 44 is generated for each viewpoint. In the distribution processing (s30), the video stream 44, for a viewpoint corresponding to or approximate to the user's line of sight information included in the request from the user terminal 14, is transmitted to the user terminal 14. A specific description will be given below.

The acquisition processing (s10) is a process for obtaining a group of hemispherical images 42 (FIGS. 1 and 4) from the camera 10. The group of hemispherical images 42 received is stored into the memory 28 in chronological order. The server 12 thus functions as an acquisition unit for obtaining a group of hemispherical images 42 from the camera 10. The memory 38 of the server 12 functions as a storage unit for storing the group of hemispherical images 42.

Figure 4:
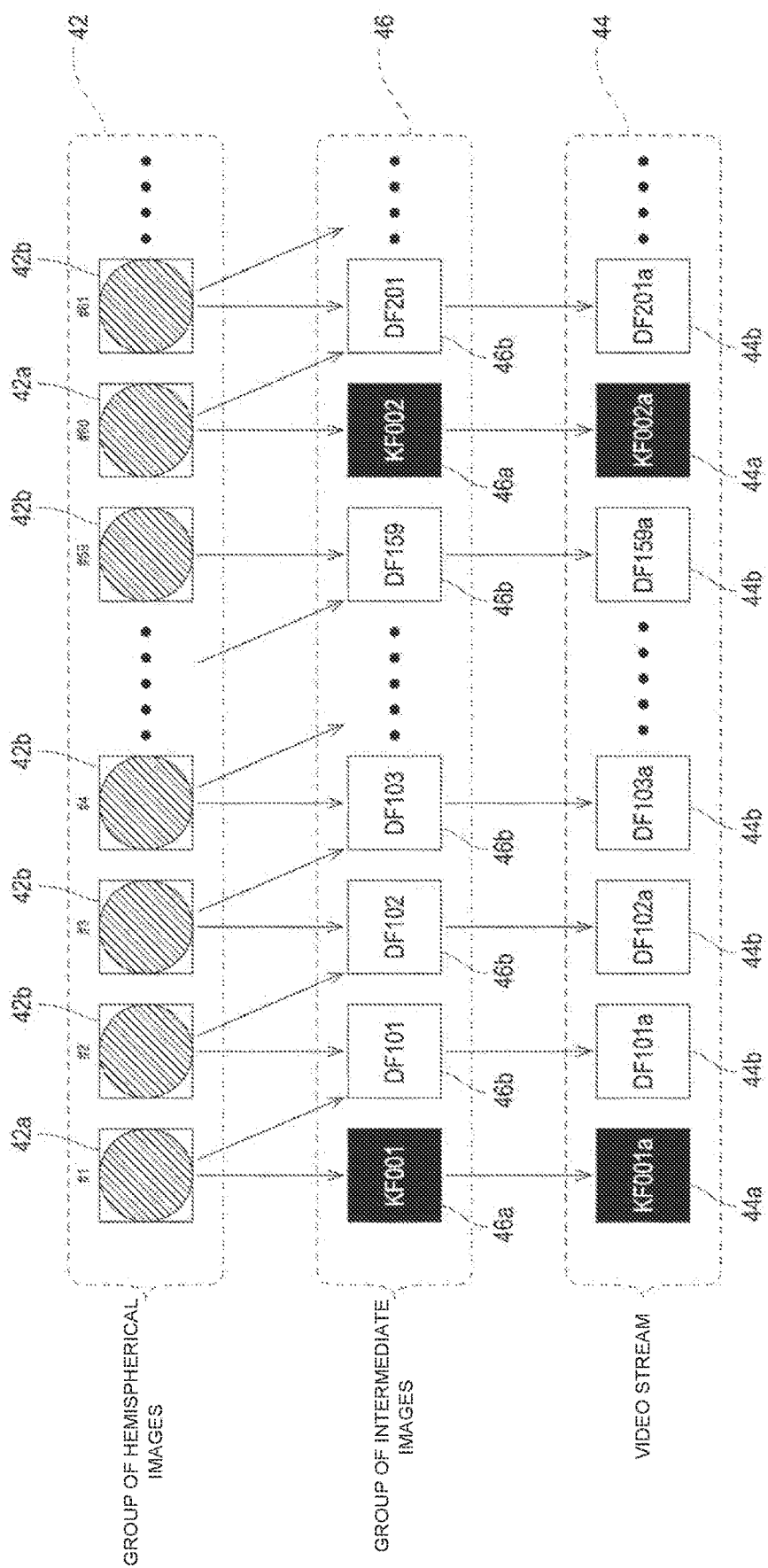
FIG. 4 is a diagram showing images generated by the generation processing.

After the execution of the foregoing acquisition processing (s10), the generation processing (s20) is executed. As shown in FIG. 4, the generation processing (s20) is a process for generating a video stream 44 (consecutive images that are consecutive in time series) for each of the predetermined viewpoints based on the group of hemispherical images 42 stored in the memory 38. The generation processing (s20) includes intermediate image generation processing (s21) and video stream generation processing (s22).

In the intermediate image generation processing (s21), the group of hemispherical images 42 stored in the memory 38 is extracted, and a group of intermediate images 46 is generated from the extracted group of hemispherical images 42 (FIG. 4). The group of intermediate images 46 includes key frame images 46a and differential frame images 46b generated by using conventional inter-frame prediction. In the present embodiment, hemispherical images 42a extracted from the group of hemispherical images 42 at regular frame intervals (in the present embodiment, at every 60 frames) are used as key frame images. The differential frame images 46b are generated by determining the differences between the other plurality of hemispherical images 42b from the frames following the hemispherical images 42a (key frame images) and the hemispherical images from the respective previous frames. The group of intermediate images 46 generated by the intermediate image generation processing (s21) is stored in the memory 38 of the server 12. Note that the hemispherical image 42 of the last frame in the group of hemispherical images 42 is extracted as a key frame image 46a to be located at the last frame in the group of intermediate images 46. In such a manner, the CPU 38 of the server 12 functions as an intermediate image generation unit for generating the group of intermediate images 46. The memory 38 of the server 12 functions as a storage unit for storing the group of intermediate images 46. The key frame images 46a and the differential frame images 46b generated by the intermediate image generation processing (s21) will hereinafter be referred to as intermediate key frame images 46a and intermediate differential frame images 46b, respectively.

The video stream generation processing (s22) is a process for generating a video stream 44 for each viewpoint based on the group of intermediate images 46. The video stream 44 is constituted by consecutive images to be distributed to the user terminal 14, and includes viewpoint-specific key frame images 44a and viewpoint-specific differential frame images 44b. As described above, the video stream 44 is generated for each viewpoint from the plurality of viewpoints defined in advance. As described above and shown in FIG. 5, the plurality of viewpoints defined in advance refers to a plurality of points defined over an imaginary full sphere including the full sphere viewed with the image sensor 28 of the camera 10 as the point of observation (base point). Each viewpoint is defined by viewpoint information including a roll angle ($\alpha$), a pitch angle ($\beta$), and a yaw angle ($\gamma$) with the point of observation as the base point. For example, the viewpoint information about a viewpoint "a" is defined as ($\alpha_a$, $\beta_a$, $\gamma_a$). The viewpoint information is stored in the memory 38 in association with viewpoint identification information assigned to the viewpoint "a." Moreover, the video stream 44 generated for the viewpoint "a" is stored in the memory 38 in association with the viewpoint identification information. In other words, the viewpoint information about each viewpoint and the video stream 44 generated for each viewpoint are stored in the memory 38 in association with the viewpoint identification information.

Figure 6A:
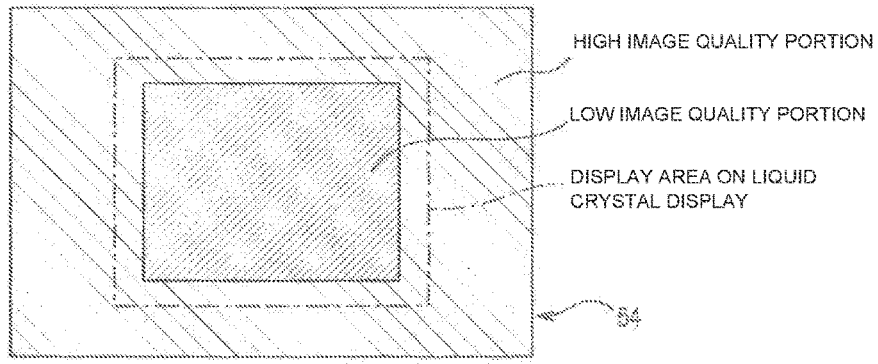
FIG. 6A-6D are diagrams showing a process of extracting pixels in video stream generation processing.
Figure 6B:
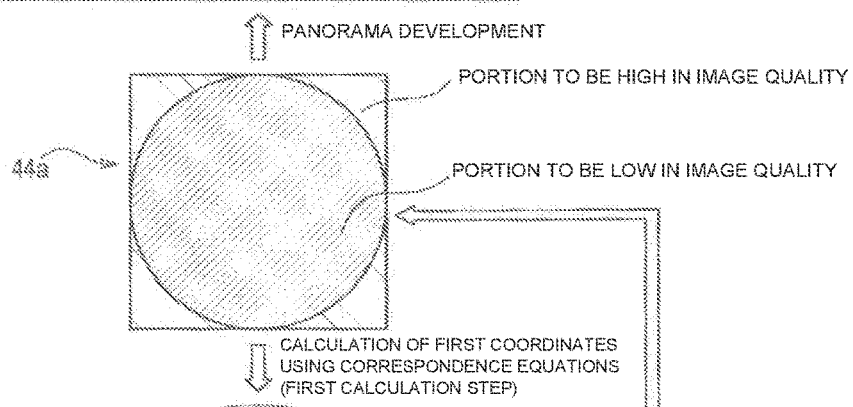

As shown in FIG. 6A, the viewpoint-specific key frame images 44a and the viewpoint-specific differential frame images 44b constituting the video stream 44 are each compressed so that the image quality decreases gradually outward from the image center when the image is developed by the user terminal 14. Take a viewpoint-specific key frame image 44a as an example. As shown in Fig. FIG. 6B, with the center of the viewpoint-specific key frame image 44a as the base point, the viewpoint-specific key frame image 44a is compressed so that the image quality inside the inscribed circle inscribed in the four sides (edges) of the viewpoint-specific key frame image 44a is high, and the image quality outside the inscribed circle (in the four corners of the image) is low. The process for generating such a viewpoint-specific key frame image 44a will be described below by using the viewpoint "a" as an example.

Figure 3B:
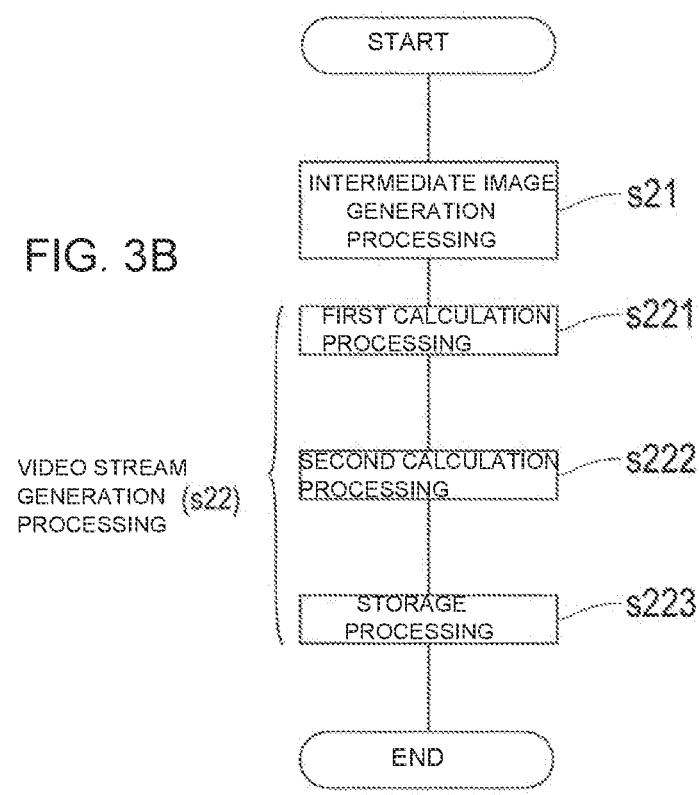
FIG. 3B is a flowchart of generation processing by the moving image generation program.
Figure 6C:
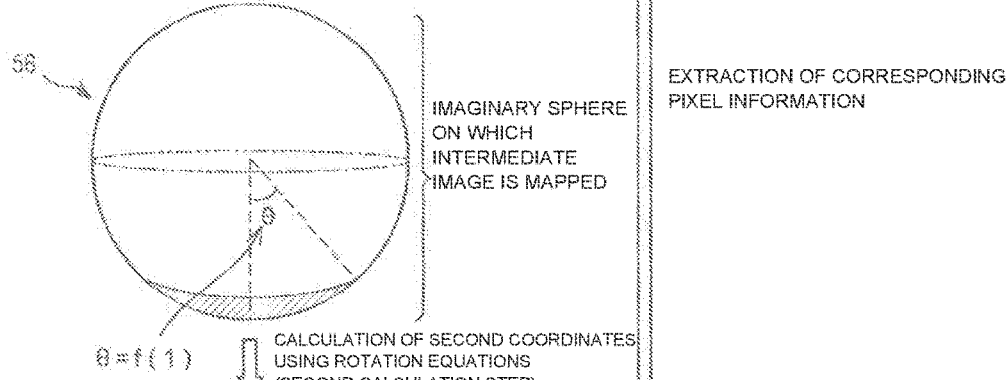
Figure 6D:
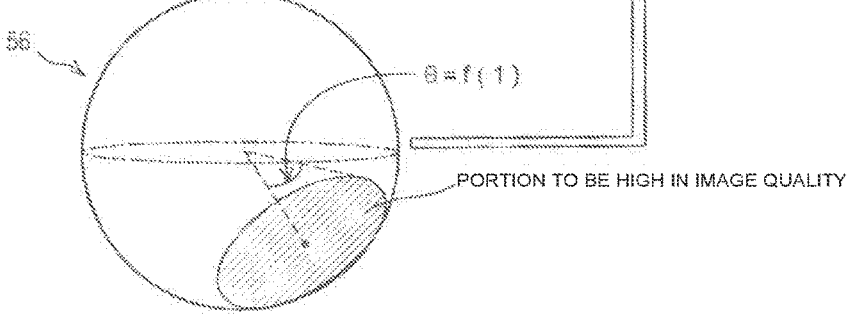
Figure 7A:
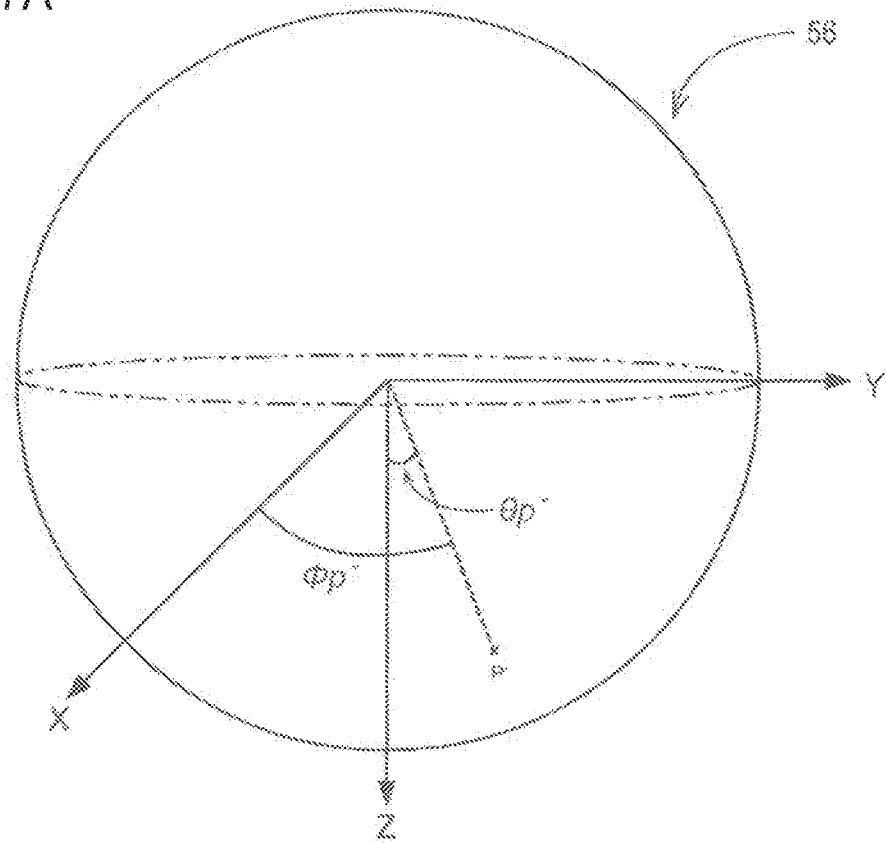
FIGS. 7A-7B are diagrams showing a correspondence between a viewpoint-specific key frame image and an imaginary sphere.
Figure 7B:
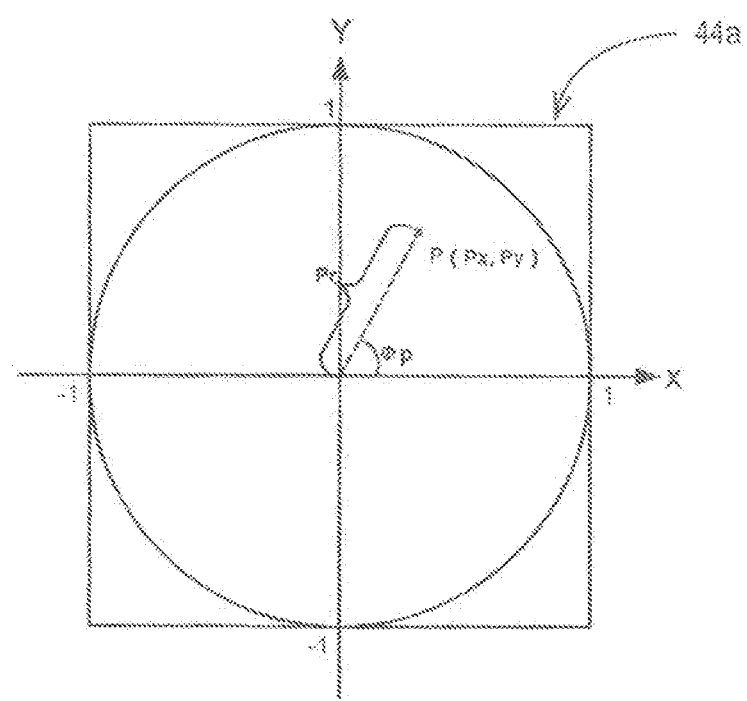

As shown in FIGS. 6C and 6D, the viewpoint-specific key frame image 44a at the viewpoint "a" (hereinafter, referred to as a viewpoint-a key frame image 44a) is generated by extracting pixels from an imaginary sphere 56 on which an intermediate key frame image 46a is imaginarily mapped. Specifically, as shown in FIG. 3B, first coordinates corresponding to each pixel constituting the viewpoint-a key frame image 44a on the imaginary sphere 56 are calculated using correspondence equations (first calculation processing (s221)). Second coordinates are calculated by applying rotation equations, which include the viewpoint information about the viewpoint "a" to the first coordinates (second calculation processing (s222)). The pixel located at the second coordinates on the surface of the imaginary sphere 56 is extracted. As shown in FIG. 7B, coordinates in the viewpoint-a key frame image 44a are expressed by XY orthogonal coordinates with the center of the viewpoint-a key frame image 44a as the origin. Here, the horizontal direction (X coordinate) of the viewpoint-a key frame image 44a takes the values of $-1 \leq X \leq 1$, and the vertical direction (Y coordinate) takes the values of $-1 \leq Y \leq 1$. As shown in FIG. 7A, coordinates on the imaginary sphere 56 are expressed by XYZ orthogonal coordinates with the center of the imaginary sphere 56 as the origin. The imaginary sphere 56 has a radius r of 1.

The foregoing first calculation processing (s221) includes spherical coordinate calculation processing for determining the spherical coordinates (r, $\theta$, $\phi$) on the imaginary sphere 56 based on the coordinates in the viewpoint-a key frame image 44a and angle of view information, and orthogonal coordinate calculation processing for determining the orthogonal coordinates (x, y, z) corresponding to the spherical coordinates. The angle of view information is information indicating the range to be displayed on the liquid crystal display 18 of the user terminal 14. In the present embodiment, the angle of view information is defined as 30°.

The spherical coordinate calculation processing will be described by using a pixel P included in the viewpoint-a key frame image 44a as shown in FIGS. 7A-7B as an example. An angle $\theta p'$ with respect to the Z-axis and an angle $\phi p'$ with respect to the X-axis of the imaginary sphere are determined as described below. The radius r of the imaginary sphere 56 is 1 as described above. The angle $\theta p'$ is determined based on a distance Pr from the origin of the XY orthogonal coordinates for the viewpoint-a key frame image 44a to the pixel P, and predetermined angle of view information. The distance Pr is determined based on coordinate values (Px, Py) of the pixel P by the following correspondence equation:

$$P_r = \sqrt{P_x^2 + P_y^2} \qquad \text{Eq. 1}$$

Figure 8A:
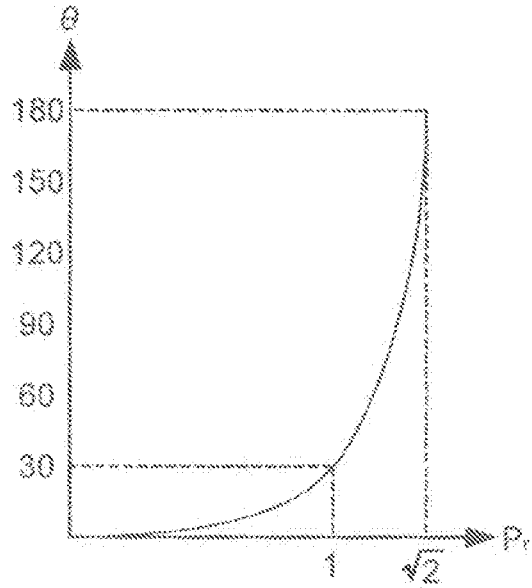
FIGS. 8A-8C showing examples of a function for angle of view information.
Figure 8B:
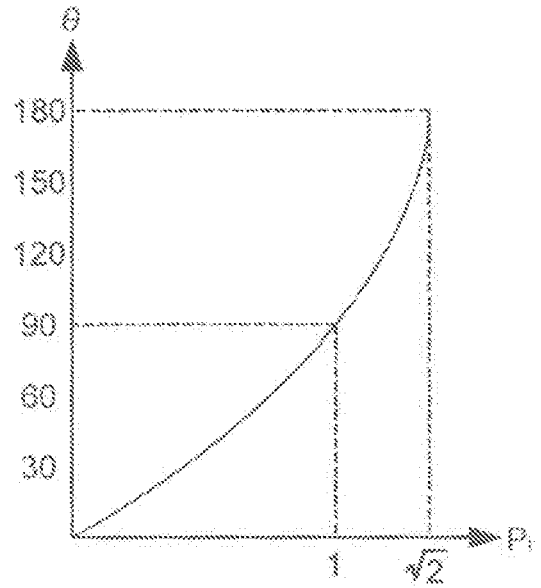
Figure 8C:
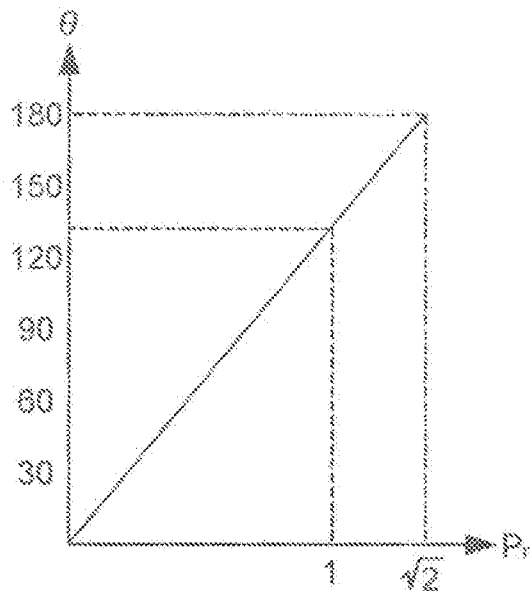

The angle $\theta p'$ is then determined by inputting the calculated value of the distance Pr into a function f(Pr) defined in advance based on the angle of view information. As shown in FIG. 8A, the function defines the relationship between the distance Pr and the angle $\theta p'$. For example, if the angle of view information is set at 30°, the function is defined so that $\theta$ is 30° at Pr=1. The angle $\theta$ at the point P is determined by substituting the distance Pr determined by the foregoing Eq. 1 into the function. In other words, the function is defined so that the border between the high pixel portion and the low pixel portion in the viewpoint-a key frame image 44a corresponds to the angle of view information. As shown in FIG. 8B, the angle of view information and the function can be defined so that if the angle of view information is 90°, $\theta$ is 90° at Pr=1. As shown in FIG. 8C, the function can be a linear function.

The angle $\phi p'$ is the same as $\phi p$ of the XY orthogonal coordinates in the viewpoint-a key frame image 44a. $\phi p$ is determined based on the coordinates (Px, Py) of the point P by the following correspondence equation:

$$\phi_p = \arctan\left(\frac{P_y}{P_x}\right) \qquad \text{Eq. 2}$$

Figure 9A:
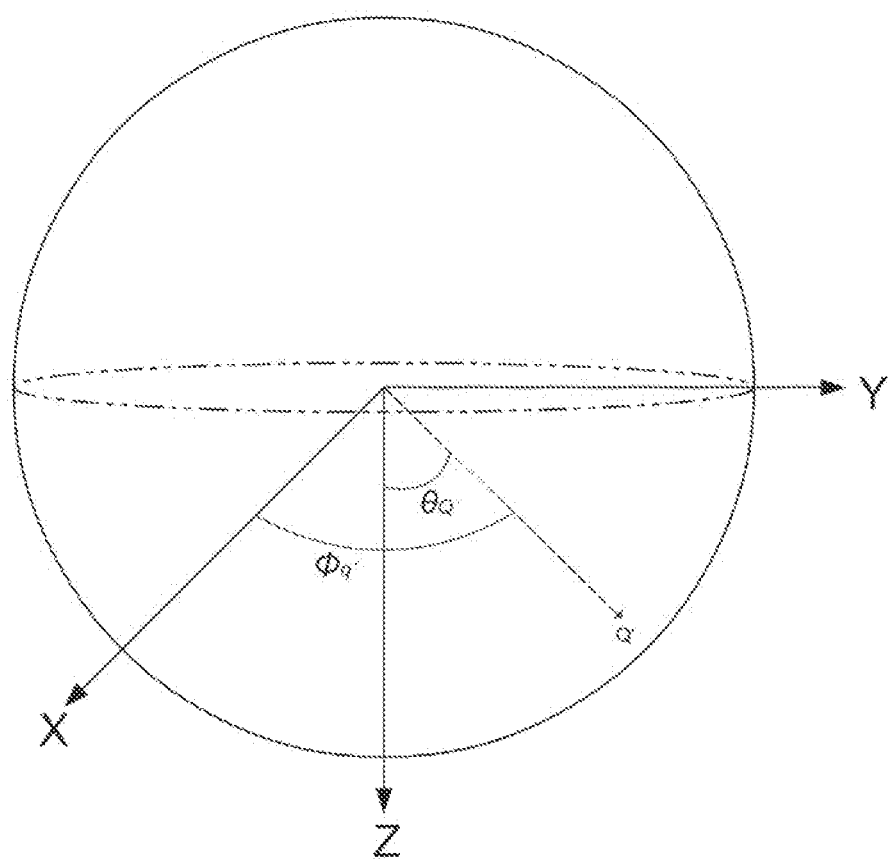
FIGS. 9A-9B are diagrams showing a correspondence when generating a low image quality portion in a viewpoint-specific key frame image.
Figure 9B:
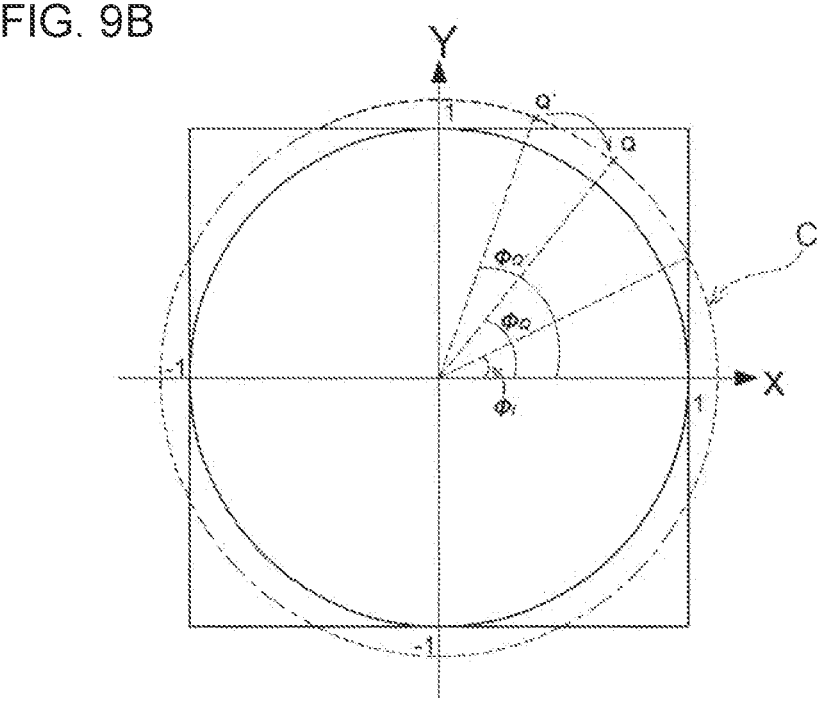

Now, suppose that as shown in FIG. 9B, the angles ϕ of pixels constituting the low image quality portion, such as pixels on a circumference C, are determined with the foregoing correspondence equation (Eq. 2). In such an embodiment, the extracted pixel information is uneven since only the pixels corresponding to the arcs shown by the dot-dashed lines are taken into consideration without taking account of the pixels located on the arcs shown by the broken lines (broken-lined arcs). In the present embodiment, the points on the circumference C including the broken-lined portions are then uniformly arranged on the dot-dashed lines based on the ratios of the broken-lined arcs to the circumference C, so that pixel information is evenly decimated and extracted to reduce the amount of information on the viewpoint-a key frame image 44a (video stream). As a result, for example, pixel information corresponding to a pixel Q' is extracted from a pixel Q on the circumference C. Such a uniform arrangement is implemented by the following correspondence equation:

$$\phi_{Q'} - 45°:\phi_Q - 45° = 45°:45° - \phi_i \quad \text{Eq. 3}$$

$$\phi_{Q'} = (\phi_Q - 45°) \times \frac{45°}{45° - \phi_i} + 45°$$

Here, $\phi_i$ is the angle for determining the ratio (proportion) of the broken-lined arcs to the circumference C.

With the spherical coordinates (1, θ, ϕ) of each pixel in the viewpoint-a key frame image 44a determined as described above, the first coordinates (x1, y1, z1) of each pixel are determined in the orthogonal coordinate calculation processing by the following conversion equations:

$$y_1 = r \times \sin \phi \times \cos \theta \quad \text{Eq. 4}$$

$$y_1 = r \times \sin \phi \times \cos \theta \quad \text{Eq. 5}$$

$$z_1 = r \times \cos \theta \quad \text{Eq. 6}$$

After the execution of the orthogonal coordinate calculation processing, the second calculation processing is executed. In the second calculation processing, a rotation equation including the point of view information ($\alpha_a$, $\beta_b$, $\gamma_a$) is applied to each set of first coordinates to determine the second coordinates (x2, y2, z2).

$$\begin{bmatrix} x_2 \\ y_2 \\ z_2 \end{bmatrix} = \begin{bmatrix} \cos\alpha_a & -\sin\alpha_a & 0 \\ \sin\alpha_a & \cos\alpha_a & 0 \\ 0 & 0 & 1 \end{bmatrix} \begin{bmatrix} \cos\beta_a & 0 & \sin\beta_a \\ 0 & 1 & 0 \\ -\sin\beta_a & 0 & \cos\beta_a \end{bmatrix} \begin{bmatrix} 1 & 0 & 0 \\ 0 & \cos\gamma_a & -\sin\gamma_a \\ 0 & \sin\gamma_a & \cos\gamma_a \end{bmatrix} \begin{bmatrix} x_1 \\ y_1 \\ z_1 \end{bmatrix} \quad \text{Eq. 7}$$

By the foregoing second calculation processing, pixels to be extracted from the imaginary sphere are identified. The information about the identified pixels is then extracted, and the extracted pixel information is assigned to respective corresponding pixels in the viewpoint-a key frame image 44a. In such a manner, the viewpoint-a key frame image 44a is generated so that inside the inscribed circle, the high image quality portion, the pixels on the imaginary sphere are extracted in a fisheye image form based on the angle of view. Outside the inscribed circle, the low image quality portion, pixels on the imaginary sphere outside the angle of view are decimated and extracted.

While the processing for generating the viewpoint-specific key frame 44a for the viewpoint "a" has been described above, viewpoint-specific differential key frame images 44b for the viewpoint "a" are generated by similar processing. The video stream 44 for the viewpoint "a" is generated in such a manner. Video streams 44 (viewpoint-specific key frame images 44a and viewpoint-specific differential frame images 44b) for other viewpoints are also generated by similar processing to that for the viewpoint "a." The generated video streams 44 are stored in the memory 38 of the server 12 while being linked to the viewpoint information (linked with the viewpoint information by association with the viewpoint identification information). The memory 38 of the server 12 thus functions as a storage unit for storing the video streams 44 for the respective viewpoints in association with the viewpoint information.

Figure 10:
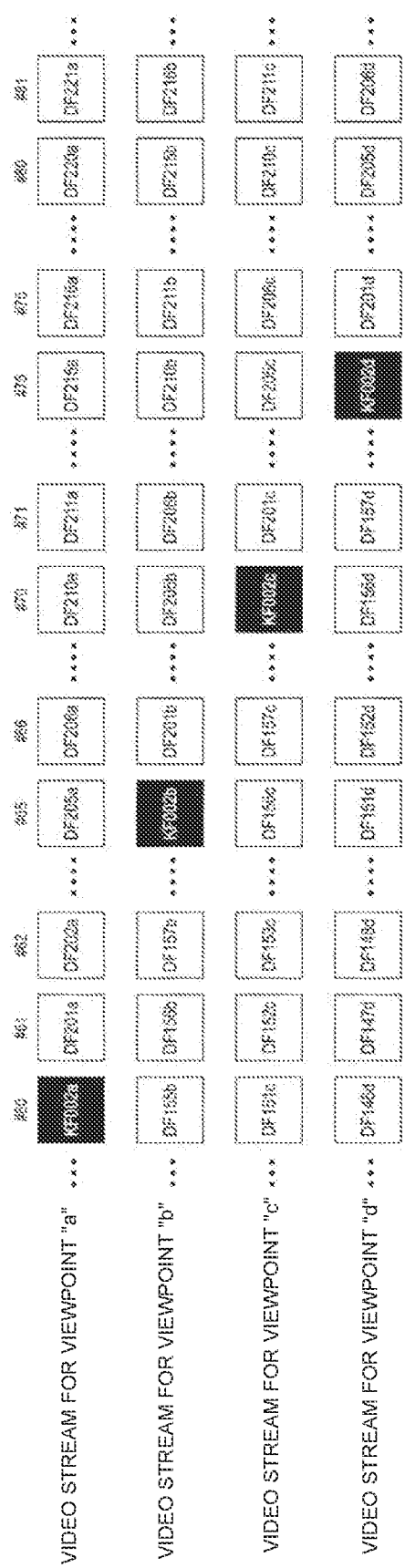
FIG. 10 is a diagram showing an example of a group of viewpoint-specific video streams.

While the video streams 44 for the respective viewpoints are generated as described above, in the present embodiment, the viewpoint-specific key frame images 44a constituting the video streams 44 are not synchronized between the viewpoints. The viewpoint-specific key frame images 44a for one viewpoint and the viewpoint-specific key frame images 44a for another viewpoint are stored in the memory 38 while being arranged at different timings in terms of time series. In other words, the video streams 44 are arranged so that their respective viewpoint-specific key frame images 44a and viewpoint-specific differential frame images 44b are asynchronous in terms of time series. For example, as shown in FIG. 10, video streams 44 for viewpoints "a" to "d" include viewpoint-specific key frame images KF002a, KF002b, KF002c, and KF002d for the respective viewpoints "a" to "d," which are images generated from an intermediate key frame image KF002. The viewpoint-b key frame image KF002b is arranged to lag behind the viewpoint-a key frame image KF002a by four frames, the viewpoint-c key frame image KF002c is arranged to lag by nine frames, and the viewpoint-d key frame image KF002d is arranged to lag by 14 frames. To make the video streams 44 asynchronous from one viewpoint to another as described above, for example in the case of the video stream 44 for the viewpoint "b," viewpoint-b key frame images KF001b (first viewpoint-specific key frame image 44a) are continuously arranged from the first frame to the fourth frame.

Next, the distribution processing (s30) for the user terminal 14 will be described.

Figure 11:
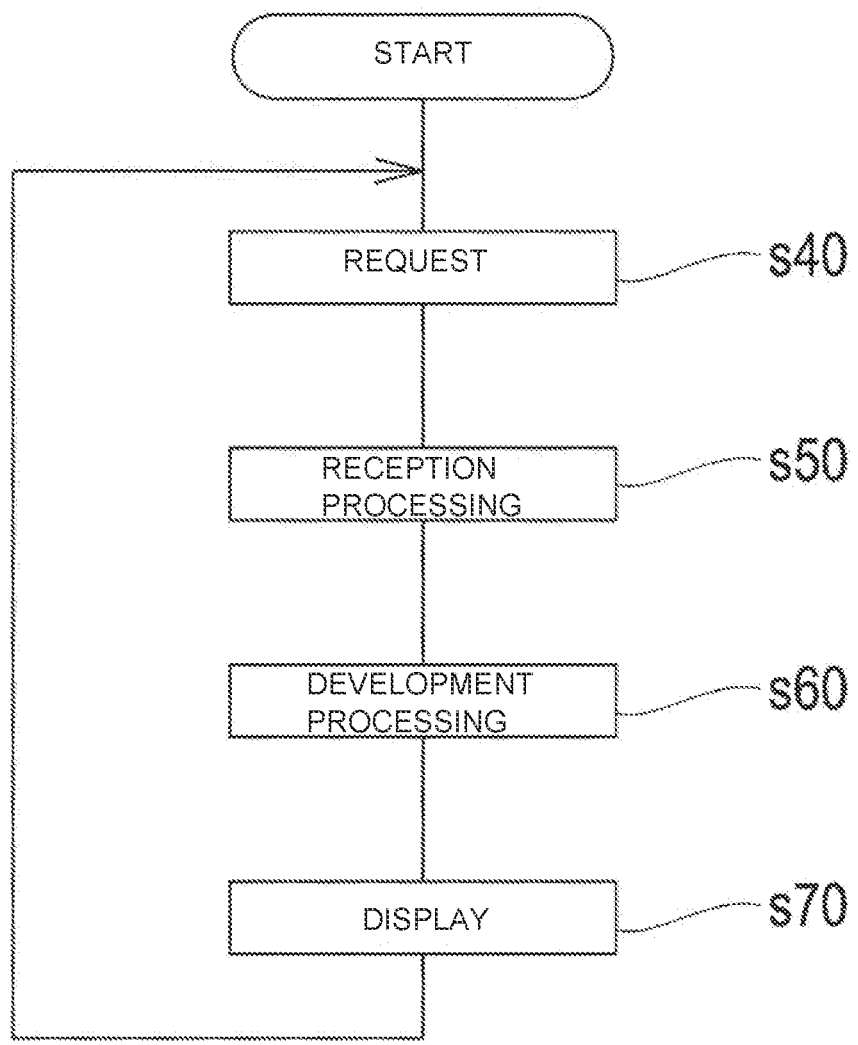
FIG. 11 is a flowchart for the user terminal.

Before the distribution processing (s30), a peer-to-peer connection between the server 12 and the user terminal 14 is established by a not-shown signaling server 12. This enables mutual communication, and the server 12 receives a request (s40) from the user terminal 14 (FIG. 11). The request is information with regards to requesting distribution of a moving image from the server 12, and includes line of sight information about the user terminal 14. The line of sight information is information indicating the line of sight of the user (the center of the image to be displayed on the user terminal 14). The line of sight information includes a roll angle (α), a pitch angle (β), and a yaw angle (γ) determined by the CPU 26 of the user terminal 14 based on the output signal of the angular velocity sensor 22.

Upon receiving the request from the user terminal 14, the server 12 compares the line of sight information included in the request with a plurality of viewpoint information stored in the memory, and distributes the video stream 44 corresponding to the viewpoint information that matches or is approximate to the line of sight information to the user terminal 14.

As shown in FIG. 11, the user terminal 14 receives the video stream 44, and performs development processing (s60). In the development processing (s60), key frame images and differential frame images for development are initially generated based on the received video stream 44. The pixels in the high image quality portions of the viewpoint-specific key frame images 44a are simply arranged in the center portions of the key frame images for development. The images of the low image quality portions in the viewpoint-specific key frame images 44a are arranged around the high image quality portions. Here, the corners pixel in the low image quality portions are not simply arranged. The position of $\phi_Q'$ is identified by using the foregoing Eq. 4, and the pixel is arranged at the identified position. Since the pixels arranged here on the circumference C including $\phi_Q'$ are not continuous, interpolation processing for interpolating pixels are performed. The interpolation processing is not limited in particular, for example, the approximate pixel is disposed between a pixel and another pixel on the same circumference. The differential frame images for development are generated by processing similar to that of the key frame images for development.

After the key frame images for development and the differential frame images for development are generated through the interpolation processing, key frame images for display and differential frame images for display are generated by using known panorama development processing. A moving image is generated based on such images, and the moving image is displayed on the user terminal 14.

Even while the moving image is displayed (reproduced) on the user terminal 14, the user terminal 14 monitors the user's line of sight by the CPU 26 checking the output of the angular velocity sensor 22, and shifts the display coordinates of the moving image based on the amount of change in the line of sight. The user terminal 14 also updates the line of sight information and transmits the line of sight information to the server 12.

Each time the line of sight information is received, the server 12 extracts the viewpoint information about video streams 44 whose key frames are located near in terms of time series. The server 12 compares the received line of sight information with the extracted viewpoint information to search for a most approximate viewpoint, and transmits the video stream 44 corresponding to the approximate viewpoint to the user terminal 14.

While the user's line of sight changes from the line of sight "a" to a line of sight "f," or more specifically, while the orientation of the user terminal 14 changes due to the user's terminal operations and the user's line of sight, detected based on the changes in the orientation, changes from the viewpoint "a" to a viewpoint "f," video streams 44 are distributed in the following manner.

Upon receiving the line of sight information from the user terminal 14, the server 12 searches for video streams 44 whose viewpoint-specific key frame images 44a are located at a timing close to the time of reception in terms of time series. Specifically, the video streams 44 stored in the memory 38 are generated to be asynchronous with each other in terms of time series as described above. The arrangement positions (arrangement timings) of the viewpoint-specific key frame images 44a in the plurality of video streams 44 thus vary from one video stream 44 to another. The CPU 12 of the server 12 calculates the arrangement positions (arrangement timings) of the key frame images based on the key frame period (60 frames) of the video streams 44 and the amounts of delay set for the respective video streams 44. The CPU 40 searches for a video stream 44 having a viewpoint-specific key frame image 44a at a timing closest to the frame image (reproduced on the user terminal 14) being distributed at the time of reception of the line of sight information.

The CPU 40 then determines whether the viewpoint information corresponding to the found video stream 44 is positionally closer to the viewpoint after the change (viewpoint "f") than the viewpoint before the change (viewpoint "a").

For example, suppose that the viewpoint-specific key frame image 44a at the viewpoint "c" is determined to be close in terms of time series as a result of the search of the viewpoint-specific key frame images 44a. In such a case, the video stream 44 for the viewpoint "c" is distributed to the user terminal 14 since the viewpoint "c" is positionally closer to the viewpoint "f" than is the viewpoint "a."

Now, suppose that the viewpoint-specific key frame image 44a at the viewpoint "g" is determined to be located at a close timing in terms of time series as a result of the search of the viewpoint-specific key frame image 44a. Even in such a case, the video stream 44 for the viewpoint "a" is distributed to the user terminal 14 since the viewpoint "g" is positionally farther from the viewpoint "f" than is the viewpoint "a."

In the moving image distribution system 1 according to the present embodiment, video streams 44 corresponding to a plurality of viewpoints are generated in advance, and a video stream 44 corresponding to the viewpoint requested by the user's line of sight can be simply distributed if the user's line of sight occurs. This can reduce an increase in the load of the server 12 even if, for example, requests are made from a large number of user terminals 14.

Suppose that the orientation of the user terminal 14 changes and the image quality decreases gradually as a result of a shift in the display coordinates of the displayed moving image. Even in such a case, the image quality of the displayed image can be prevented from dropping significantly, since a video stream 44 including a viewpoint-specific key frame image 44a close in terms of the time series and position is distributed.

Second Embodiment

In the foregoing first embodiment, the server 12 selects the video stream 44 to be distributed based on the line of sight information received from the user terminal 14. In a second embodiment, the user terminal 14 selects a video stream 44 to be received based on the line of sight information, and requests the server 12 to distribute the selected video stream 44. The following description will deal mainly with configurations and flows different from those of the first embodiment. A description of configurations and methods similar to those of the first embodiment will be omitted as appropriate.

In the present embodiment, like the first embodiment, the video streams 44 generated for each viewpoint are stored in the memory of the server 12 in association with the viewpoint identification information. However, the present embodiment is different from the first embodiment in that the viewpoint information is not stored in the memory 12 of the server 12. In the present embodiment, the viewpoint information are stored in the memory 24 of the user terminal 14 in association with the viewpoint identification information.

In the present embodiment, like the first embodiment, the plurality of video streams 44 generated for each viewpoint include viewpoint-specific key frame images 44a. In the plurality of video streams 44, the initial viewpoint-specific key frame images 44a are offset so that the viewpoint-specific key frame images 44a are arranged to be asynchronous with each other in terms of time series. In the present embodiment, the arrangement timings of the viewpoint-specific key frame images 44a in the video streams 44 for the respective viewpoints are stored in the memory 24 of the user terminal 14. The arrangement timings indicate at which timings (frames) the viewpoint-specific key frame images 44a of the respective video streams 44 for each viewpoint are arranged. The arrangement timings typically represent an interval (arrangement period) between viewpoint-specific key frame images 44a in the video streams 44 and the offset numbers (numbers of frames to be delayed) of the initial viewpoint-specific key frame images 44a in the video streams 44 for their respective viewpoints. In the present embodiment, as shown in FIG. 4, the viewpoint-specific key frame images are arranged at every 60 frames, thus having an interval of "60." As shown in FIG. 10, the viewpoint-specific key frame image 44a at the viewpoint "a" is not offset, so the offset number for the viewpoint "a" is thus "0." The initial viewpoint-specific key frame image 44a in the video stream 44 for the viewpoint "b" is offset by four frames, so the offset number for the viewpoint "b" is thus "4." Similarly, the offset number for the viewpoint "c" is "9," and the offset number for the viewpoint "d" is "14." The arrangement timings thus defined for each viewpoint are stored in association with the viewpoint identification information. Each viewpoint identification information is stored in association with the viewpoint information.

As described above, the user terminal 14 according to the present embodiment determines the video stream 44 for a viewpoint to be received based on the line of sight information, and requests the server 12 to distribute the video stream 44 for the determined viewpoint. Specifically, the user terminal 14 performs line of sight information acquisition processing, request processing, and display processing in this order.

(1) The line of sight information acquisition processing is a process where the CPU 26 of the user terminal 14 obtains the line of sight information based on the output from the angular velocity sensor 22. Like the first embodiment, the CPU 26 obtains a roll angle ($\alpha$), a pitch angle ($\beta$), and a yaw angle ($\gamma$).

(2) In the request processing, viewpoint information approximate to the line of sight information obtained in the foregoing line of sight information acquisition processing is extracted, and viewpoint identification information corresponding to the extracted viewpoint information is transmitted to the server 12. Upon receiving the viewpoint identification information from the user terminal 14, the server 12 distributes the video stream 44 corresponding to the viewpoint identification information to the user terminal 14.

(3) The display processing is a process for displaying the video stream 44 on the liquid crystal display 18 while receiving the video stream 44 from the server 12.

By the foregoing flow, the initial stage of the distribution and display of the video stream 44 is performed.

As described above, the CPU 26 of the user terminal 14 displays a video stream 44 while performing the line of sight information acquisition processing, determination processing, the request processing, and the display processing in synchronization with the frame rate of the video streams 44 to display a video stream 44 corresponding to a change in the line of sight caused by the user operating the user terminal 14.

(4) The line of sight information acquisition processing is similar to the foregoing process (1), i.e., a process for obtaining the line of sight information (roll angle ($\alpha$), pitch angle ($\beta$), and yaw angle ($\gamma$)) based on the output of the angular velocity sensor 22.

(5) The determination processing is a process for determining the video stream to request from the server 12. The CPU 26 of the user terminal 14 selects viewpoint identification information where a viewpoint-specific key frame image 44a is located near in terms of time series.

(5-1) Specifically, the CPU 26 identifies the frame number of the video stream 44 being reproduced (hereinafter, reproduction frame number). For example, if the video stream 44 for the viewpoint "a" is being reproduced and the 100th frame image is being displayed, the frame number is identified as "100."

(5-2) Next, the CPU 26 calculates the arrangement positions of the viewpoint-specific key frame images 44a for each viewpoint based on the interval and offsets defined as the arrangement timings. The CPU 26 extracts the number of the key frame that is located after the identified frame number and near in terms of time series.

For example, the arrangement timing for the viewpoint "b" is defined so that the interval is "60" and the offset is "4." The position of the first viewpoint-specific key frame image 44a at the viewpoint "b" is thus determined to be "5," "65" for the position of the second viewpoint-specific key frame image 44a, "125" for the position of the third viewpoint-specific key frame image 44a, and "185" for the position of the fourth viewpoint-specific key frame image 44a. Each time the position of such a viewpoint-specific key frame image 44a is determined, the CPU 26 calculates a difference in position from the identified frame number "100." The position of the viewpoint-specific key frame image 44a with the smallest difference, specifically, the position "124" of the third viewpoint-specific key frame image is determined to be approximate to the identified frame number "100."

The CPU 26 performs similar calculations on the viewpoints "c," "d," . . . . For the viewpoint "c," the position "129" of the third viewpoint-specific key frame image is determined to be approximate to the identified frame number "100." For the viewpoint "d," the position "74" of the second viewpoint-specific key frame image is the most approximate to the identified frame number "100." However, since the position "74" is located before the identified frame number "100," the second closest position "134" of the third viewpoint-specific key frame position is determined to be approximate to the identified frame number "100."

With the positions of the approximate viewpoint-specific key frame images 44a thus calculated for each viewpoint, the viewpoint where the position is the most approximate to the identified frame number is selected. In the foregoing example, the viewpoint approximate to the identified frame number "100," viewpoint "b," is selected.

(5-3) With the viewpoint where the viewpoint-specific key frame image 44a is the closest (in the foregoing example, viewpoint "b") selected, a distance between the foregoing viewpoint (viewpoint "b") and the line of sight information is calculated. Moreover, a distance between the viewpoint under reproduction (viewpoint "a") and the line of sight information is calculated. The smaller of the two distances is then determined as the viewpoint for reproduction, and the viewpoint identification information corresponding to the viewpoint is extracted. In other words, if the viewpoint currently under reproduction (viewpoint "a") is approximate to the line of sight information, the viewpoint currently under reproduction (viewpoint "a") continues to be requested. On the other hand, if the viewpoint, where the viewpoint-specific key frame is located at a timing close to the currently reproduced frame (viewpoint "b"), is closer to the line of sight information in terms of coordinates than is the viewpoint currently under reproduction (viewpoint "a"), the video stream 44 for the viewpoint (viewpoint "b") is newly requested.

(6) In the request processing, the viewpoint identification information and the identified frame number are transmitted to the server 12. Upon receiving the viewpoint identification information and the frame number, the server 12 transmits the video stream 44 that corresponds to the viewpoint identification information and starts at the frame image corresponding to the identified corresponding frame number to the user terminal 14.

(7) The user terminal 14 displays the received video stream 44 with a position corresponding to the line of sight information at the center of the liquid crystal display 18.

Third Embodiment

The user terminal 14 according to the foregoing first and second embodiments has a reproduction mode for reproducing a video stream 44 distributed from the server 12 while receiving the video stream 44. However, the reproduction mode is not restricted to the foregoing process. A third embodiment does not include the server 12, and the video streams 44 generated for each viewpoint are stored in the memory 24 of the user terminal 14 in association with viewpoint information. Like the first and second embodiments, the plurality of video streams 44 are arranged so that their viewpoint-specific key frame images 44a are asynchronous with each other in terms of time series by offsetting their first viewpoint-specific key frame images 44a. The arrangement timings of the viewpoint-specific key frame images 44a in the video streams 44 for the respective viewpoints are stored in the memory 24 of the user terminal 14.

In such a present embodiment, the user terminal 14 performs line of sight information acquisition processing and reproduction processing in this order.

(1) The line of sight information acquisition processing is a process where the CPU 26 of the user terminal 14 obtains line of sight information based on the output from the angular velocity sensor 22. Like the first and second embodiments, the CPU 26 obtains a roll angle ($\alpha$), a pitch angle ($\beta$), and a yaw angle ($\gamma$).

(2) In the reproduction processing, viewpoint information having a value approximate to the line of sight information obtained by the foregoing line of sight information acquisition processing is extracted, and the video stream 44 corresponding to the extracted viewpoint information is reproduced.

As described above, the CPU 26 of the user terminal 14 reproduces the video stream 44, while performing the line of sight information acquisition processing and the reproduction processing in synchronization with the frame rate of the video streams 44, to reproduce a video stream 44 corresponding to a change in the line of sight caused by the user operating the user terminal 14.

(4) The line of sight information acquisition processing is a process similar to the foregoing process (1), i.e., a process for obtaining the line of sight information (roll angle ($\alpha$), pitch angle ($\beta$), and yaw angle ($\gamma$)) based on the output of the angular velocity sensor 22.

(5) The reproduction processing is a process for determining the video stream 44 to be reproduced and reproducing the video stream 44. The CPU 26 of the user terminal 14 selects viewpoint information where a viewpoint-specific key frame 44a is located near in terms of time series at the time of reproduction, and selects the video stream 44 to be reproduced based on the selected viewpoint information and the line of sight information obtained in the foregoing process (4).

(5-1) Specifically, the CPU 26 identifies the frame number of the video stream 44 being reproduced (hereinafter, reproduction frame number).

(5-2) Next, the CPU 26 calculates the arrangement positions of the viewpoint-specific key frame images 44a, in their respective viewpoint-specific video streams 44 stored in the memory 24, based on the arrangement timings. The CPU 26 then calculates the numbers of frames to the calculated arrangement position of the key frame images in their respective viewpoint-specific video streams 44. More specifically, the CPU 26 counts the number of frames from the reproduction frame number to the arrangement position of the key frame images, and identifies the viewpoint-specific video stream 44 that has a key frame image with the smallest count value, whereby the viewpoint information corresponding to the viewpoint-specific video stream 44 is extracted.

(5-3) Next, a distance between the extracted viewpoint information and the line of sight information obtained in the foregoing process (4) is calculated. Moreover, a distance between the viewpoint information about the video stream 44 being reproduced and the line of sight information is calculated. The viewpoint with the smaller distance of the two is determined as the viewpoint for reproduction, and the video stream 44 corresponding to the viewpoint is reproduced.

More specifically, if the viewpoint information about the video stream 44 currently being reproduced is approximate to the line of sight information about the user, the video steam 44 currently being reproduced continues to be reproduced. On the other hand, if the viewpoint information where the viewpoint-specific key frame image 44a is located at a timing close to the frame currently being reproduced is closer to the line of sight information about the user in terms of coordinates than is the viewpoint information currently under reproduction, the video stream 44 corresponding to the viewpoint information is newly reproduced.

The present invention is not limited to the foregoing embodiments, and the following configurations can be employed.

Modification 1

In the foregoing embodiments, the viewpoint-specific video streams 44 are generated based on a group of hemispherical images captured by the camera 10. However, viewpoint-specific video streams can be generated based on a group of fully spherical images captured by the camera 10. Moreover, the spherical surface is not limited to a hemispherical or fully spherical one, and an imaginary spherical surface of infinite radius viewed with a camera 10 having an angle of view of 45° as the point of observation can be used. The present invention can thus generate viewpoint-specific video streams based on a group of spherical images captured by the camera 10.

Modification 2

In the foregoing embodiments, the camera 10 that captures an image of the real world is used. However, a camera that captures an image of a virtual world can be used.

Modification 3

In the foregoing embodiments, the acquisition processing and the generation processing by the server 12 are not necessarily indispensable. Video streams 44 can be prepared in association with a plurality of viewpoints in advance and stored in the memory 38 before distribution to the user terminal 14.

Modification 4

In the foregoing embodiments, the video streams 44 are arranged so that the viewpoint-specific key frame images 44*a* are asynchronous between the viewpoints in terms of time series. However, the viewpoint-specific key frame images can be made asynchronous by successively arranging images irrelevant to the viewpoint-specific key frame images or viewpoint-specific differential frames, such as a plurality of blank images, at the beginning of the video streams, for example. Alternatively, the video streams for their respective viewpoints can be configured so that the viewpoint-specific key frame images are arranged at different arrangement intervals. For example, the viewpoint-specific key frame images can be made asynchronous in terms of time series by arranging the viewpoint-specific key frame images for the viewpoint "a" at every 60 seconds, the viewpoint-specific key frame images for the viewpoint "b" at every 55 frames, the viewpoint-specific key frame images for the viewpoint "c" at every 50 frames, and the viewpoint-specific key frame images for the viewpoint "d" at every 45 frames.

Modification 5

In the foregoing second embodiment, the arrangement list is defined by an interval value and offset values since the key frames are at a constant interval. However, such a configuration is not restrictive. For example, if the key frames are placed at random intervals, a position (number) list of the key frames in each video stream can be stored in association with the viewpoint identification information.

Modification 6

The foregoing embodiments are configured so that when the line of sight is changed by the user operating the user terminal 14, a video stream 44 including a viewpoint-specific key frame image 44*a* at the closest timing in terms of time series is selected to be distributed or reproduced. However, the timing is not limited to the closest one, and a video stream 44 including a viewpoint-specific key frame image 44*a* at a close timing can be selected.

Focusing on the video stream 44 for the viewpoint positionally closest to that of the video stream 44 being distributed or reproduced (video stream 44 for the nearest viewpoint), the "close timing" here means that the counted number of frames from the distribution timing (reproduction timing) is less than a reference frame count number, where the reference frame count number is the counted number of frames from the distribution timing (reproduction timing) to the key frame image in the video stream 44 for the nearest viewpoint.

More specifically, the arrangement positions (arrangement timings) of the viewpoint-specific key frame images 44*a* in their respective viewpoint-specific video streams 44 are calculated. If the arrangement position (arrangement timing) of a viewpoint-specific key frame image 44*a* before or after the distribution timing (reproduction timing) is less than the reference frame count number, the video stream 44 is selected as the video stream including a viewpoint-specific key frame image 44*a* at a close timing in terms of time series. The viewpoint information of the selected video stream 44*a* is then compared with the line of sight information after the change.

The foregoing reference frame count number can be one obtained by subtracting a number of frames that takes into account a distribution delay due to the network environment.

The invention claimed is:

1. A moving image distribution method comprising:
   storing a plurality of video streams for each viewpoint of a plurality of viewpoints defined on a sphere with a camera as a point of observation, each video stream of the plurality of video streams including an entire-spherical image so that the image of the viewpoint corresponding to the video stream is contained in the center; and
   distributing one of the plurality of video streams, which is a video stream of the viewpoint of the plurality of viewpoints other than a nearest viewpoint corresponding to a line of sight determined by a user's terminal, to the user's terminal,
   the distributing the video stream includes distributing the video stream for the viewpoint other than the nearest viewpoint of the plurality of viewpoints, corresponding to the line of sight determined by the user's terminal, on the sphere.

2. The moving image distribution method according to claim 1, wherein
   each of the video streams includes a key frame image and a differential frame image; and
   the key frame image included in the one of the video streams and the key frame image included in another of the video streams are asynchronous in terms of time series.

3. The moving image distribution method according to claim 2, wherein the distributing includes using, as the one of the plurality of video steams, the video stream where the key frame image is located near in terms of the time series when the line of sight changes.

4. The moving image distribution method according to claim 2, wherein the another of the video streams includes a plurality of key frame images arranged in succession.

5. The moving image distribution method according to claim 2, wherein the key frame image in the another of the video streams is arranged to lag behind the key frame image in the one of the video streams.

6. The moving image distribution method according to claim 2, wherein an arrangement interval of the key frame image in the another of the video streams is different from that of the key frame image in the one of the video streams.

7. A moving image distribution apparatus comprising:
   a storage unit configured to store a plurality of video streams for each viewpoint from a plurality of viewpoints defined on a sphere with a camera as a point of observation, each video stream of the plurality of video streams including an entire-spherical image so that the image of the viewpoint corresponding to the video stream is contained in the center; and
   a distribution unit configured to distribute one of the plurality of video streams, which is the video stream of the viewpoint other than a nearest viewpoint corresponding to a line of sight determined by a user's terminal, to the user's terminal.

8. A moving image reproduction method comprising:
   storing a plurality of video streams for each viewpoint of a plurality of viewpoints defined on a sphere with a camera as a point of observation, each video stream of the plurality of video streams including an entire-spherical image so that the image of the viewpoint corresponding to the video stream is contained the center; and reproducing one of the plurality of video streams which is a video stream of the viewpoint other than a nearest viewpoint corresponding to a line of sight determined by a user's terminal, on the user's terminal.

9. A distribution data structure comprising a plurality of video streams including an image on a line of sight directed from a specific point of observation in a center portion thereof and an image of an entire sphere captured from the point of observation outside the center portion, the plurality of video streams including:
   a first video stream of the plurality of video streams including an image at a viewpoint on a first line of sight directed from the specific point of observation in the center portion and
   a second video stream of the plurality of video streams including an image at a viewpoint on a second line of sight directed from the point of observation in the center portion.

10. A distribution data structure according to claim 9, comprising:

the first video stream and the second video stream each including a key frame, and the key frame in the first video stream and the key frame in the second video stream being asynchronous in terms of time series.

11. A distribution data structure according to claim 10, comprising:
   timing information about the key frame in the first video stream; and
   timing information about the key frame in the second video stream.

12. The moving image distribution method according to claim 3, wherein the another of the video streams includes a plurality of key frame images arranged in succession.

13. The moving image distribution method according to claim 3, wherein the key frame image in the another of the video streams is arranged to lag behind the key frame image in the one of the video streams.

14. The moving image distribution method according to claim 3, wherein an arrangement interval of the key frame image in the another of the video streams is different from that of the key frame image in the one of the video streams.

* * * * *